# 2,769,001

DYESTUFFS

Bernard Gehauf, Baltimore, Md., assignor to the United States of America as represented by the Secretary of War No Drawing. Application February 24, 1945,
Serial No. 579,645

1 Claim. (Cl. 260—240)

(Granted under Title 35, U. S. Code (1952), sec. 266)

The invention, described herein may be manufactured and used by or for the Government, for governmental purposes, without payment to me of any royalty thereon.

This invention relates to a series of dyestuffs, their preparation, and use. More particularly, it relates to dyestuffs prepared by reacting organic compounds containing a pyridine ring and a pyrazolone ring in the presence of a cyanogen compound and characterized by a bluish coloring.

Orange and red coloring matters of practical value prepared by reacting pyridine with cyanogen halides and coupling the reaction product with aromatic amines, have been reported in the literature. It is also known that certain azo dyestuffs containing a pyrazolone ring and characterized by yellow coloring have been prepared from diazonium salts and from pyrazolonesulphonic acids.

An object of this invention is to provide a unique type of pyrazolone dyestuffs having a valuable set of shades and uses.

Another object of this invention is to provide a method for obtaining a series of dyestuffs by reaction of pyrazolone and its derivatives with pyridine ring containing compounds and cyanogen compounds.

A further object is to provide a type of pyrazolone dyestuff which may be modified to dyes of various other shades.

A still further object is to provide dyes having a number of valuable uses, for example, as indicators, color sensitizers, for photographic emulsions, dyeing of fabrics, and the like.

In accordance with the present invention, blue and magenta dyes having promising practical application are produced by reacting pyridine ring containing organic compounds with pyrazolone ring containing compounds in the presence of cyanogen compounds such as cyanogen chloride, cyanogen bromide, cyanuric chloride, or other agents capable of splitting the pyridine ring to form glutaconic aldehydes.

Dyes made from pyridine and 1 phenyl 3-methyl 5-pyrazolone are readily produced in good yield. The sodium salt is sparingly soluble in water to give a dye bath that dyes cotton, regenerated cellulose and cellulose acetate fibers a bright blue shade fast to washing and moderately fast to light. This particular dye determined to be the compound

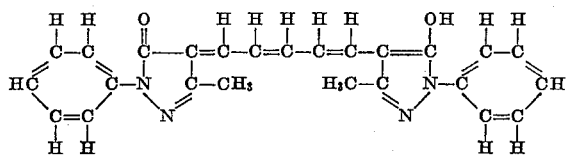

has no affinity for wool or silk, but it is probable that the substitution of certain groups into the molecule would confer affinity for these fibers. The blue dye is sensitive to weak acids changing from blue to orange at about pH 6.

When the blue dye formed as above is boiled for several hours in water containing sodium carbonate or other alkali the blue coloring matter is converted to a stable magenta coloring matter the exact formula of which is unknown to the applicant, resembling the rhodamines in color. The sodium salt of this dystuff has the same dyeing properties as the original blue dye, producing brilliant bluish-pink shades on cotton, rayon, and celanese.

The pink dyestuff also shows the interesting property of forming blue complexes with ions. When a soluble silver salt such as the nitrate is added to a solution of the dye a deep blue-colored solution is produced which on standing separates the silver-dye complex as an insoluble dark-blue precipitate which on drying exhibits a brilliant bronze reflex. The blue complex is destroyed by chlorides forming silver chloride and liberating the pink dye. The dye can be used as an indicator for titrating chlorides with standard silver solution or for estimating silver and it may have valuable application as color sensitizers for photographic emulsions.

The following represents a typical laboratory preparation of the dyestuffs:

Example

Thirty-eight grams of 1 phenyl 3-methyl 5-pyrazolone were mixed with 10 grams of pyridine in a 2-liter beaker. In separate beakers solutions of 5 g. sodium cyanide in 5 ml. water and 28 g. chloramine T in 500 ml. water were prepared. The latter solutions were then rapidly mixed together and the whole poured rapidly into the pyridine-pyrazolone mixture with rapid stirring. An intense violet color formed at once which rapidly changed to a bluer shade. The mixture was stirred continuously until spots placed on filter paper indicated that the original violet color had completely changed to a pure blue. The mixture was left to stand for an hour and then the separated dye filtered off with suction. A further crop of crystals was obtained by salting out the filtrate. The product was a dark blue fibrous mass showing a bronze lustre when rubbed, sparingly soluble in water and easily soluble in acetone and alcohol.

The run was repeated but instead of filtering off the blue coloring matter, 50 grams of sodium carbonate was added and the mixture heated to near boiling for about two hours, or until spot tests made on filter paper indicated that all of the blue dye had been converted to the magenta form. The mixture was cooled and the separated dye filtered with suction. The product was a dark red fibrous mass sparingly soluble in water, and easily soluble in acetone and alcohol.

Various substituted pyridines and pyrazolones were tried in the reaction and it is found that they may be used to form dyestuffs having similar compositions and colors. As indicated in the foregoing example, it was discovered that the blue coloring matter formed by the reaction of the pyridine compound and the pyrazolone compound in the presence of a cyanogen compound could be converted to another dye by boiling in alkaline solution. Further, it was noted that cuprous salts precipitate the magenta dye as a blue coloring matter and that the silver ion had a similar but even more marked effect.

In alternative methods of preparation, cyanogen halides, preferably the chloride or bromide, cyanuric chloride, or hydrogen cyanide may be used.

Although specific examples have been given of certain types of reactants and reaction dye products to illustrate the invention, it is to be understood that other types and modifications come within the spirit and scope of the invention as designed in the appended claim.

I claim:

A magenta dye stuff produced by boiling a blue dye stuff of the formula

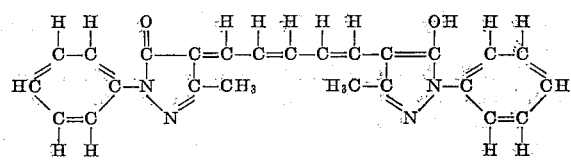

in a sodium carbonate solution until said blue dye stuff is converted into a stable magenta coloring matter characterized by the ability to form blue complexes both with silver ions and with cupric ions.

References Cited in the file of this patent

UNITED STATES PATENTS

| | | |
|---|---|---|
| 2,094,580 | Brooker | Oct. 5, 1937 |
| 2,211,762 | Brooker | Aug. 20, 1940 |
| 2,319,547 | Kendall | May 18, 1943 |
| 2,369,355 | Kendall | Feb. 13, 1945 |

FOREIGN PATENTS

| | | |
|---|---|---|
| 351,515 | Great Britain | 1931 |
| 425,609 | Great Britain | 1933 |
| 428,359 | Great Britain | 1935 |